United States Patent [19]

Minnick et al.

[11] Patent Number: 5,175,198
[45] Date of Patent: Dec. 29, 1992

[54] THERMOFORMABLE/POLYCARBONATE/WOVEN GLASS CLOTH COMPOSITES

[75] Inventors: Michael G. Minnick, Fort Wayne, Ind.; Daniel E. Floryan, Coshocton, Ohio

[73] Assignee: General Electric Company, Worthington, Ohio

[21] Appl. No.: 753,159

[22] Filed: Aug. 30, 1991

[51] Int. Cl.$^5$ .......................... C08K 7/02; C08K 7/14
[52] U.S. Cl. .................................. 523/222; 524/494; 428/34.5; 428/251; 428/268; 428/412
[58] Field of Search ............... 523/222; 428/412, 251, 428/268, 473.5, 920, 34.5; 524/494

[56] References Cited

U.S. PATENT DOCUMENTS

| | | | |
|---|---|---|---|
| 3,408,225 | 10/1968 | Streib et al. | 428/412 |
| 4,098,754 | 7/1978 | Neuray et al. | 524/494 |
| 4,201,832 | 5/1980 | Hall et al. | 428/412 |
| 4,255,483 | 3/1981 | Byrd et al. | 428/920 |
| 4,481,338 | 11/1984 | Senni et al. | 524/494 |
| 4,552,911 | 11/1985 | Cohnen et al. | 524/494 |
| 4,609,592 | 9/1986 | Liu et al. | 428/412 |
| 4,737,414 | 4/1988 | Hirt et al. | 428/412 |
| 4,987,026 | 1/1991 | Jacobs et al. | 428/268 |

*Primary Examiner*—Paul R. Michl
*Assistant Examiner*—LaVonda DeWitt
*Attorney, Agent, or Firm*—Millen, White, Zelano and Branigan

[57] ABSTRACT

Thermoformable composites comprised of polycarbonate/woven glass cloth and methods for their preparation are provided which have good flammability characteristics and physical properties and are suitable for use in aircraft interiors.

17 Claims, No Drawings

THERMOFORMABLE/POLYCARBONATE/-WOVEN GLASS CLOTH COMPOSITES

BACKGROUND OF THE INVENTION

The present invention is directed to thermoformable composites of flame-retardant polycarbonate and woven glass cloth suitable for use in aircraft interiors.

The Federal Aviation Administration (FAA) upgraded its fire and smoke standards for aircraft interior components on Aug. 20, 1990. The FAA dropped the allowable heat-release rate for materials governed under Federal Aviation Regulation (FAR) 25.853, which includes ceiling and wall panels, partitions, outer surfaces of galleys, large cabinets, and storage compartments. The heat-release test used, ASTM E906, subjects a sample of a material to 3.5 watts/cm$^2$ of radiant heat and the heat subsequently released from the sample is determined. The earlier standards required a maximum of 100 kW/min/m$^2$ of heat release during the first two minutes and a peak release of 100 kW/m$^2$ during a five-minute period (100/100 rule). The recent requirements dropped the allowable heat-release rate to 65/65.

Restrictions on smoke release for aircraft interior component materials have also been implemented. A maximum specific optical smoke density of less than 100 is required by most aircraft manufacturers (based on four-minute samples), as determined under ASTM E662. The material must also meet the flammability requirements of FAR 25.853(a) and (a-1) which requires the component material be self-extinguishing when tested vertically (60 seconds exposure to a Bunsen burner flame) in accordance with FAR 25, Appendix F (Part IV). Furthermore, the materials must meet burn-through requirements under FAR 25.853 according to FAR 25, Appendix F, Part III and toxicity requirements by aircraft manufacturers.

Heretofore, aircraft interior components have comprised reinforced composites utilizing phenolic resins as the matrix material. Phenolic resins have been used because of their high heat resistance, rigidity, adhesion to reinforcements, and solvent resistance. While phenolic resins appear to satisfy the new FAA requirements, the aircraft industry is still seeking a more flame-resistant thermoplastic composite material. Materials which exceed the FAA requirements are sought in contemplation of further restrictions by the FAA. For these and other reasons, the individual airlines have their own smoke- and gas-release limits, flame spread index, and burn-through requirements.

Cost pressures have directed efforts toward the development of plastic materials with improved flammability characteristics since their use reduces manufacturing costs and weight penalties associated with fabricated metal parts.

For a new airplane interior component to be readily accepted in the market, its architecture and function must be compatible with existing airplane structures for retrofitting purposes. In addition to meeting flammability requirements, these interior components should at least maintain, if not improve, the durability and maintainability of previous parts with a weight no greater, and preferably less, than that of existing parts. The same is true for functions such as the ease of installation and removal. Additionally, the components should be capable of accepting a variety of decorative effects and configurations as determined by each individual airline.

ULTEM® polyetherimide has been found to provide the required flammability performance in non-reinforced films. This material is vacuum thermoformable, allowing low-cost processing. However, without reinforcement, these ULTEM® polyetherimide films require thick sections to meet the stiffness requirements of certain interior components, such as a sidewall panel. In addition, it can be difficult, if not impossible, to meet burn-through requirements without reinforcement.

Aircraft interior components comprised of 40-50 wt % ULTEM® polyetherimide/knitted woven glass cloth composites require less material and provide excellent flammability performance and improved stiffness. It is desirable to provide a less costly component with similar performance however. It is also desirable to provide such a composite which can be prepared from conventional continuous process equipment which operates at temperatures below about 250° C.

SUMMARY OF THE INVENTION

It is an object of the present invention to provide aircraft interior components comprised of a new thermoplastic composite which exceeds FAA flammability requirements.

It is another object of the present invention to provide thermoformed composites having a glossy finish with excellent flammability resistance and physical properties.

A further object of the present invention is to provide a planar thermoplastic composite comprised of 40-50 wt % flame-retardant polycarbonate and three plies of knitted woven glass cloth (50-60 wt %) which can be thermoformed to provide aircraft interior components which exceed FAA flammability requirements.

It is a further object of the present invention to provide a process for the melt-impregnation of high density knitted woven glass cloth with flame-retardant polycarbonate resin so as to allow thermoforming of the resulting composite.

These and other objects will be apparent from the detailed disclosure and claims which follow.

The invention is directed to aircraft interior components comprising at least 50 wt % woven glass cloth and up to 50 wt % of a flame-retardant matrix material which comprises flame-retardant polycarbonate resin. These interior components have flammability properties which meet or exceed FAA requirements. The invention is also directed to flame-resistant, vacuum-thermoformed composites having a glossy surface finish which comprise the same materials. This composite is non-planar in configuration and has uses other than in aircraft interiors.

The invention is also directed to a planar composite comprising at least 50 wt % knitted woven glass cloth and a flame-retardant polycarbonate matrix material. This composite has three plies of knitted woven glass cloth. The flame-retardant matrix material may interface with another layer such as a flame-retardant cap layer or a core layer.

In the process of this invention for making composites, 2-4 sheets of knitted woven glass cloth are laid-up between sheets of flame-retardant polycarbonate film with a core layer of non-flame-retardant thermoplastic. The lay-up is subjected to heat and pressure to melt impregnate the glass with flame-retardant polycarbonate. To control the thickness of the composite product, it is cooled under pressure.

DETAILED DESCRIPTION OF THE PREFERRED EMBODIMENTS

The aircraft interior components of this invention include those components within aircraft which primarily provide a protective lining or surface, such as the passenger compartment sidewall. These interior components also include parts with some support function, such as housings, shelves, and trays.

The components of this invention more specifically include sidewall panels, ceiling panels, floor panels, equipment panels, partitions, window moldings, window slides, storage liners, cargo liners, equipment housings, seat housings, speaker housings, ducts, duct housings, grids, grid housings, shelves, trays, and storage housings.

These interior components preferably have from 2-4 plies of fiber reinforcement to provide the desired rigidity and high fiber content. Most preferably, the component contains three plies. The number of plies will depend on the component shape and its utility.

The aircraft interior components preferably have a glossy finish as is consistent with their decorative function. A glossy finish, as defined herein, can be smooth or textured without imperfections visible to the naked eye caused by voids in the matrix or exposed fibers. However, where the components have more of a protective function such as in cargo liners, a glossy finish is not necessary.

The fiber reinforcement is a significant part of the composite that forms the aircraft interior components of this invention. The fiber reinforcement must provide a significant amount of glass within the composite, i.e., in excess of 50 wt %, preferably 50-60 wt %, for both rigidity and flame-retardance. The fiber reinforcement must facilitate melt impregnation and adhesion of thermoplastic resins thereto and it must survive vacuum thermoforming without tearing where deep draws are required in forming three dimensional parts. While there are many styles of fiber reinforcement available, continuous glass cloths, both knitted and satin weaves, have been found to be well suited for use in this invention. While other fiber reinforcements can be thermoformed, such as non-woven glass mat and chopped glass reinforced sheet, it is difficult to obtain the high fiber densities required. Continuous glass cloth have been found to provide composites with the required fiber density. Knitted glass cloth is readily shaped around corners because it exhibits greater axial compliance, whereas satin weaves exhibit only shear compliance. Of the satin weaves, heavier reinforcement has been found to shape more readily than an equivalent loading of finer weave. Satin weaves provide good rigidity but are difficult to shape and can tear from deep draw and/or cornering requirements when thermoforming. Knitted weaves resist tearing when thermoformed and are preferred in parts with deep draw requirements and/or have deep corners. The knitted woven glass cloths provide high mechanical strength and stiffness and are high in density so as promote flammability performance. Both the satin and knitted weaves are easily wetted by the flame-retardant matrices used herein by melt impregnation.

The knitted and satin glass weaves are available in many styles and densities. Examples of suitable glass cloths available commercially include "CONFORM" satin weave (9.1 oz/sq.yd) by JPS Glass Fabrics, Slater, S.C.; Style 6781 8H and 120E 4H satin weaves of Clark Schwebel Industries; and 2 Bar Raschelle Knit (2BRK), styles 8790 and 88081, by Varinit Corp., Greenville, S.C.

The 8790 style is a less dense weave having a basis weight of about 6.5 ounces per square yard. The 88081 style is a tighter weave having a basis weight of 8.5 ounces per square yard. The 6781 8H style satin weave glass cloth has a basis weight of 8.95 ounces per square yard and the 120E 4H style satin weave glass cloth has a basis weight of 3.16 ounces per square yard.

The glass cloth used preferably has a finish/sizing that enhances wet-out. A finish for 2BRK knitted woven glass cloth under the designation "642", available from BGF Industries, has been found to be acceptable. The finishes on the other cloths referred to above are also acceptable. Selection or modification of the glass finish or sizing may be desirable to improve processing or reduce lofting.

These glass cloths are typically available rolled on a mandrel and may be positioned for lamination by adhesion to a film of the matrix thermoplastic using a solvent solution of this matrix thermoplastic. Folded cloths may be preferred to avoid curling at the edges and the discontinuous widths that can occur with rolled cloths.

The flame-retardant matrix material comprises a "flame-retardant polycarbonate resin", which is defined herein as a polycarbonate resin with an amount of bromine incorporated into the polymer chain (or into blend components of the formulation) effective to provide improved flammability performance over polycarbonate resins comprised of the unmodified bisphenol-A monomer, 2,2-bis(4-hydroxyphenyl)propane. Preferably, the flame-retardant polycarbonate resin (or blend) comprises at least 12 wt % bromine. Higher levels of bromine are preferred in this invention. A flame-retardant grade LEXAN® polycarbonate film under the designation "FR-60", obtained from formulation designation "ML 9237", will provide suitable flammability performance for the aircraft components of the present invention.

Any of the commercially available polycarbonates, particularly LEXAN® polycarbonate, produced by General Electric Company, is suitable for use in the matrix of the aircraft interior components of this invention if modified (or blended) to enhance flammability performance. Those skilled in the art will recognize the many forms of polycarbonate which are typically produced by polycondensation of bisphenol-A and phosgene in the presence of alkali. The polycarbonate formulations can contain conventional additives, such as stabilizers, to protect against degradation. Those used to form films typically have a slip/release agent to aid processing. The amount and type of these additives will depend on the end use desired.

The bromine is preferably incorporated in the polymer and is typically introduced through the use of the monomer tetrabromo-bisphenol-A (TBBPA) of the formula

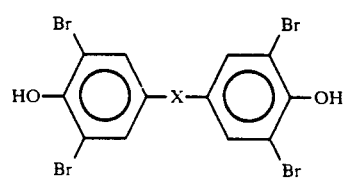

wherein X is typically 2,2-propane. Such monomers are typically used with unmodified bisphenol-A monomers to obtain polycarbonate block copolymers. These block copolymers can be used by themselves to provide 100% of the flame-retardant matrix, or they can be blended with other resins, including non-flame-retardant polycarbonates. The amount of bromine can be controlled by varying the proportion of TBBPA monomer in the block copolymer and/or by varying the amount of the block copolymer in the blend with non-flame-retardant resin. Blends of polycarbonate (50:50 TBBPA/BPA) block copolymer with non-flame-retardant polycarbonate at about a 1:1 ratio provide sufficient bromine and suitable flammability performance for the aircraft components of this invention. Formulations which provide higher levels of bromine improve flammability performance. A preferred matrix for the aircraft components is derived from films of 50:50 TBBPA/BPA-polycarbonate block copolymer, Tg 174° C. Such films can be used in a variety of thicknesses, preferably within the range of 1-10 mils.

The flame-retardant matrix may contain other flame-retardant resins such as polyetherimide or polysulfone in amounts up to about 50% by weight of the matrix material and up to 25 wt % of the aircraft interior component. These resins must be compatible with polycarbonate and are either blended therewith or a separate layer thereof is interfaced with the polycarbonate during lamination.

The flame-retardant matrix may also contain non-flame-retardant resins to provide other properties. These include polyamide resins, polybutyleneterephthalate resins, non-flame-retardant polycarbonate, polystyrene, polyethylene, polyethyleneterephthalate, polypropylene, and other resins conventionally blended with polycarbonate. These resins are blended with the polycarbonate in small amounts. These resins can form a significant part of the aircraft interior component of up to about 50 wt % as a core matrix, if encapsulated by the flame-retardant matrix. This is accomplished by "capping" layers of the non-flame-retardant resins with layers of flame-retardant resins during lamination.

Preferably, the aircraft interior components of this invention are obtained by vacuum thermoforming a composite having the glass reinforcement and flame-retardant matrix described above. Vacuum thermoforming is an efficient and economical means for processing finished parts due to the short cycle times that are available. The aircraft interior components so made will substantially maintain the physical properties of the composite, including flame retardance and impact properties. The composites used typically have a thickness of about 4 to about 60 mils, preferably about 30 mils.

The aircraft interior components of this invention are self extinguishing when tested according to FAR 25.853, Appendix F, preferably in less than 2 seconds, most preferably in less than 1 second, with a vertical burn length of less than about 6", preferably less than 5". These components will show a heat-release rate, as determined by the Ohio State University heat release test (ASTM E906), of less than 65, preferably less than 50 kW/min/m² for the first two minutes, with a peak release during a 5 minute period of less than 65, most preferably less than 50 kW/m². These components also meet the burn-through requirements under FAR 25, Appendix F, Part III. In these tests, a sample of the laminate (about 19"×24") is positioned about 6" above a burner, and a monitor is positioned on the other side to determine if the temperature remains below 400° F. within the first 5 minutes.

The components of the present invention show an optical smoke density of less than 200, which meets FAA requirements. In preferred embodiments, the optical smoke density is less than 100 and most preferably less than 50 so as to satisfy manufacturer's standards. Smoke density measurements are obtained using a National Bureau of Standards (NBS) smoke chamber, wherein a sample is typically exposed to 2.5 watts/cm² of heat while exposed to six pilot flames to achieve ignition. The optical smoke density is measured by determining changes in light transmittance in the chamber at 4-minute intervals.

The aircraft interior components of this invention meet manufacturer' requirements for the release of toxic emissions upon ignition. Ignition releases emissions with less than 3500 ppm CO, less than 500 ppm HCl, less than 150 ppm HCN, less than 200 ppm hydrogen fluoride, less than 100 ppm of sulfur oxides, and less than 100 ppm nitrous oxide, as required by the manufacturers in the aircraft industry. Typically, there are no HCl, HCN, HF, or $SO_x$ emissions, less than 2 parts/million $NO_x$ emissions and less than 1000 ppm CO emissions. These emissions are determined by color changes in Drager tubes using fixed volumes of gaseous emissions withdrawn from the NBS chamber described above.

These composites provide parts with impact properties which satisfy the industry standards. By these standards, the aircraft internal components must maintain a flexural strength greater than 2000 psi and must exceed 50 lbs. deflection in a 4 point flexural test over a 22" span for a 3" wide beam. The aircraft interior components of this invention will meet these requirements so as to withstand handling and retrofitting within airplanes. The interior components of this invention can be colored so as to match the existing patterns and colorations characteristic of the particular airline.

While the aircraft interior components of this invention are preferably obtained by vacuum thermoforming techniques they may be obtained by other means such compression forming with matched steel dies utilizing high pressure.

Included within the articles provided by this invention are non-planar composites that comprise the fiber reinforcements and flame-retardant matrixes described above which have utility other than in aircraft interiors. These articles are flame-retardant, vacuum thermoformed composites having at least one Class A surface finish and preferably physical and impact property profiles similar to those of the aircraft interior components described above. These composites are non-planar in configuration following vacuum thermoforming and can have a shape in which the original planar composite is drawn out of plane by 5-20% of its original length. These non-planar composites maintain a glossy finish following vacuum thermoforming and deformation of the original planar composite. Preferably, these non-planar composites contain knitted woven glass cloth fiber reinforcement, preferably in three plies. These non-planar composites have use in other transportation vehicles such as automobiles, boats, submarines, and the like, and in the interior and exterior of residences, offices, and factories.

Conventional vacuum thermoforming equipment (shuttle machines) can be used to form the aircraft interior components of this invention. To form these components, a composite sheet having the requisite fiber reinforcement and flame-retardant matrix material is fed between top and bottom platens of a vacuum thermoforming unit, with the female end of a forming tool positioned therein. The temperature is raised to soften the composite, with calrod heaters positioned at the top and bottom plates. Typically, the heaters are set at about 50% output. The vacuum is applied through the tool once the composite is softened, allowing the sheet to be drawn into and conform to the tool. A cap layer may be used if the composite is too porous to be drawn into the tool. Preferably, the molded article can be removed from the tool in less than 30 seconds.

Thermoformability is directly related to the number of plies of fiber reinforcement as well as the nature of the fiber reinforcement. A larger number of plies used to fill the weight requirement of reinforcement will allow for more readily shaping around corners, with a minimum of wrinkling. In vacuum thermoforming, to maintain a class A finish in the composite, it is necessary for the fiber network to be completed melted and to remain embedded within the composite without rising to the surface.

The planar composite preferred for thermoforming provided by this invention is one having three plies of a knitted woven glass cloth which forms at least 50 wt % and up to 60 wt % of the composite. The matrix material for this composite preferably comprises a 50/50 tetrabromo BPA/BPA polycarbonate block copolymer having a glass transition temperature of about 174° C. This planar composite optionally has polyetherimide cap layers on the outer surfaces and/or a core layer of another material which is not flame-retardant but is compatible with polycarbonate. This core layer can provide improved wetability and impact properties with the appropriate selection of materials. The use of polyetherimide cap layers enhances smoke density reduction, appearance, and burn-through characteristics.

These planar composites utilize knitted woven glass cloth as reinforcement. Between these fiber reinforcements are positioned flame-retardant polycarbonate films, preferably under the designation LEXAN ® DL 1895 polycarbonate film (Tg=174° C.), obtained from LEXAN ® ML 9996 polycarbonate (both produced by General Electric Company) at a thickness of about 4-5 mils.

To form these planar composites, flame-retardant polycarbonate films are preferably positioned as the outer layers of a lay-up. The subsequent underlying layers on each side of the lay-up are lengths of knitted woven glass cloth, preferably drawn from separate rolls. To avoid neck-down, it may be desirable to stretch these cloths before positioning within the press. Two thermoplastic films that form the core layer are positioned between these lengths of cloth and a third length of cloth positioned in the center of the lay-up. LEXAN ® DL 1900 non-flame-retardant polycarbonate film, at about 4 mils thickness obtained from LEXAN ® ML 9735 polycarbonate, are preferred for the core layer. Such a configuration also provides for improved drawability when thermoforming.

Many other configurations distinct from the lay-up described above are possible. The construction of the laminate or composite affects thermoforming properties and may be selected so as to enhance the finish and flammability of the resultant products. Typical sizes for the composites produced from these lay-ups range from 24"×24" to 48"×76". Sizes in this range will allow for the production of wall panels for the interior of aircraft.

These lay-ups are transferred to or formed within a press pan of a press, such as a Wabash 150 T press or a Contiroll press made by Simpelkamp. Preferably the press has platens with multiple heating zones which can be heated to melt impregnate the cloths at a temperature of from about 200°-260° C. Press times at these temperatures range from 5 to 30 minutes, preferably about 20 minutes, with speeds preferably ranging from 3-5 fpm in the Contiroll press. Following the heat cycle, the laminate is preferably cooled under pressure in subsequent zones to prevent lofting. In a Contiroll press, it is preferable for only one zone to be heated and all subsequent zones left unheated to avoid lofting. Slower speeds allow maximum dwell time in the cooler zones, reducing lofting.

Where extensive lofting of the product provides a composite material too high in thickness, subsequent pressing of the laminate in a steam press will consolidate the laminate to the desired thickness.

The pressure applied to the lay-up by the platens ranges from 50-600 psi with platen pressures of up to 2,500 psi. Preferably, copper foil (0.5-1.0 oz./ft.$^2$) is used as a release on the top and the bottom platens to prevent wrinkling. Seasoning the press pans with release agents (Freekote 44, Freekote 800-NC, or McLube 1711) also aids release of the composite following lamination.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above and below, are hereby incorporated by reference.

EXAMPLES 1-4

Composites suitable for forming aircraft interior components are first pressed utilizing several different glass cloths and formulations for the flame-retardant matrix of polycarbonate.

In Examples 1-4, films of polycarbonate (LEXAN ® DL 1895 polycarbonate film) of from 3-5 mil thickness are used to form three-ply composites of a configuration wherein a layer of 2BRK knitted woven glass cloth (8790 or 88081 styles) is positioned in the center, surrounded by 0.004-0.005" layers of flame-retardant polycarbonate film (LEXAN ® DL 1895 polycarbonate film) on each side, followed by layers of 2BRK knitted woven glass cloth (8790 or 88081 styles), all of which are positioned between outer layers of flame-retardant polycarbonate film (LEXAN ® DL 1895 polycarbonate film).

The 8790 style 2BRK glass cloth has 18 wales/inch, 20 courses/inch, a basis weight of 6.5 ounces/square yard and is provided by Varinit Corp., Greenville, S.C. The 88081 style has a basis weight of 8.5 ounces per square yard with a tighter weave and is also supplied by Varinit Corp. The LEXAN ® DL 1895 polycarbonate film is obtained from LEXAN ® ML 9996 polycarbonate. This formulation comprises 50:50 tetrabromo BPA/BPA polycarbonate block copolymer Tg≈174°

C., with a conventional polycarbonate stabilizer (less than 1%) and a slip agent/release agent (less than 1%) to aid processing.

In Example 2, a film cap of polyetherimide resin (ULTEM ® DL 1648 polyetherimide film) of about 0.001-0.002" thickness, obtained from ULTEM ® 1000 polyetherimide, is used over the polycarbonate film. In Example 4, LEXAN ® DL 1900 non-flame-retardant polycarbonate film is used to provide the matrix in the core. In this configuration, a layer of 88081 style knitted glass cloth is used in the center, is surrounded by layers of LEXAN ® DL 1900 non-flame-retardant polycarbonate film (0.005" to 0.007" thickness) on each side, followed by layers of 2BRK knitted woven glass cloth (style 88081), all of which are positioned between films of LEXAN ® DL 1895 polycarbonate film as described above. LEXAN ® DL 1900 polycarbonate film is obtained from LEXAN ® ML 9735 polycarbonate, which comprises homopolymers of unmodified BPA monomers, a conventional stabilizer and slip/release agent, both at less than 1 wt %.

These laminates are pressed using a Wabash 150 T-press with electrically heated platens. Pressures of about 400 psi, and temperatures of about 245° C. are used. The dwell time in the press is about 20 minutes and, in all systems, the laminate is allowed to cool under pressure.

COMPOSITES A-C

For comparison purposes, Composites A-C are made utilizing the same fiber reinforcement as in Examples 1-4; however, different matrixes are used. In Composite A, the matrix is formed from LEXAN ® DL 1900 (non-flame-retardant) polycarbonate film. In Composite B, the matrix is polybutyleneterephthalate and a cap layer of polyethlyeneterephthalate is used. In Composite C, the matrix is polyetherimide.

The components for the composites of Examples 1-4 and Composites A-C are summarized in Table 1 below. The flame-retardant properties, toxicity and physical properties are summarized in Table 2. The data shows that the flammability performance and physical properties of the composites used in the present invention are comparable to the more costly polyetherimide composites.

A comparison between the flammability performance of the reinforced flame-retardant polycarbonate resin composites of Examples 1-4 and the non-reinforced flame-retardant polycarbonate resin cannot be made in that samples of non-reinforced polycarbonate resin will not remain supported within the test equipment. Structures which cannot be evaluated for heat release or smoke density by the standard tests are typically unacceptable for use as aircraft interior components.

TABLE 1

| | Composition of Composite Films | | | | | | |
|---|---|---|---|---|---|---|---|
| Example | 1 | 2 | 3 | 4 | A | B | C |
| Glass type | 2BRK 8790 | 2BRK 8790 | 2BRK 88081 | 2BRK 88081 | 2BRK 88081 | 2BRK 88081 | 2BRK 8790 |
| Plies | 3 | 3 | 3 | 3 | 3 | 3 | 3 |
| Cap Film | None | DL 1648[a] | None | None | None | ICI[b] (S) | None |
| Outer Film | DL 1895[1] | DL 1895 | DL 1895 | DL 1895 | DL 1900[2] | XL 1722[3] | DL 1611[4] |
| Inner Film | DL 1895 | DL 1895 | DL 1895 | XL 1900 | DL 1900 | XL 1722 | DL 1611 |

[1]DL 1895 = LEXAN ® DL 1895 polycarbonate film (flame-retardant)
[2]DL 1900 = LEXAN ® DL 1900 polycarbonate film (non-flame-retardant)
[3]XL 1722 = polybutyleneterephthalate film
[4]DL 1611 = ULTEM ® DL 1611 polyetherimide film
[a]DL 1648 = ULTEM ® DL 1648 polyetherimide film
[b]ICI = polyethyleneterephthalate film

TABLE 2

PROPERTIES OF 2BRK COMPOSITES

| EXAMPLE | 1 | 2 | 3 | 4 | A | B | C | FAA REQUIREMENT |
|---|---|---|---|---|---|---|---|---|
| % RESIN | 44.6 | 47.4 | 44.6 | 37 | 36 | 45 | ~46* | |
| THICKNESS | .031" | .035" | .031" | .028" | .027" | .035" | .031" | |
| FLEX STR. (L) | 44.4M | 39.3M | 43.2M | 49.4M | 48.7M | 35.8M | 53.7M | |
| (C) | 32.0M | 34.3M | 42.6M | 47.1M | 43.7M | 24.4M | 39.9M | |
| FLEX MOD. (L) | 1.67 MM | 1.19 MM | 1.58 MM | 1.87 MM | 2.27 MM | 1.46 MM | 2.10 MM | |
| (C) | 1.16 MM | 1.16 MM | 1.47 MM | 1.78 MM | 1.89 MM | 1.05 MM | 1.93 MM | |
| NOTCHED IZOD | | | NB | | | NB | | |
| BURNTHROUGH (FAR 25.853, APP$_2$ F) | MARGINAL | PASS | NT | NT | NT | NT | PASS | |
| OSU 2 MIN K$_H$/ MIN/M$^2$ | 38 | 41 | 39 | 37 | 70 | 61 | 34 | 65 |
| PEAK @ MIN | 48 | 58 | 50 @ 1.2 | 44 @ 1.0 | 101 @ 0.8 | 69 @ 0.8 | 56 @ 1.1 | 65 |
| SMOKE DENSITY, (DS MAX) | 62 | 42 | 77 | 116 | 82 | 206 | 3 | 200 |
| @ TIME. | 4 MIN. | 4 MIN. | 3.99 MIN. | 4.1 MIN. | 4 MIN. | 3.59 MIN. | 3.97 MIN. | |
| VERTICAL BURN LENGTH | 4.6 IN. | 4.3 IN. | 4.9 IN. | 5.0 IN. | 10 IN. | 5.7 IN. | 4.0 IN. | SE** |
| TIME | 1.0 SEC. | 1.0 SEC. | 1.0 SEC. | 5.0 SEC. | 30 SEC. | 1.0 SEC. | 1.0 SEC. | |
| EMISSION | | | | | | | | |
| HCl, ppm | 0 | 0 | 0 | 0 | | 0 | 0 | 500 |
| HCN | 0 | 1 | 0 | 0 | | 0 | 2 | 150 |
| HF | 0 | 0 | 0 | 0 | | 0 | 0 | 200 |
| SO$_x$ | 0 | 0 | 0 | 0 | | 0 | 0 | 100 |
| CO | 200 | 500 | 90 | 100 | | 100 | 100 | 3500 |

TABLE 2-continued

PROPERTIES OF 2BRK COMPOSITES

| EXAMPLE | 1 | 2 | 3 | 4 | A | B | C | FAA REQUIRE-MENT |
|---|---|---|---|---|---|---|---|---|
| NO₃ | 1 | 3 | 3 | 2 | | 1 | 10 | 100 |

*CALCULATED VALUE
**SE = SELF EXTINGUISHING
NT = NOT TESTED
NB = NO BREAK

EXAMPLES 5-14

The configurations of large panel composites which will form aircraft interior components of this invention (Examples 5-14) are given below in Table 3, as defined by the key which follows. The panels for Examples 5 and 7-14 were made on a Wabash 150T press as used in Examples 1-4. The panels (about 48"×76") for Example 6 are formed within a 2020 Contiroll press under continuous or semi-continuous conditions. Speeds in the range of 3-5 fpm are used in feeding the press. Copper foil is used on the bottom and top platens to aid release:

TABLE 3

Composite Configurations

| Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|
| A | A | A | A | A | A | X | A | A | A |
| 1 | 2 | 2 | 2 | 2 | 2 | A | 4 | 5 | 4 |
| A | B | A | A | B | B | 2 | B | 5 | B |
| 1 | 2 | 2 | 3 | 2 | 2 | B | 4 | B | 4 |
| A | B | A | A | A | A | 2 | A | 5 | B |
| 1 | 2 | 2 | 2 | 2 | | B | | 5 | 4 |
| A | A | A | A | B | | 2 | | B | A |
| | | | | 2 | | A | | 5 | |
| | | | | | | A | | X | |
| | | | | | | | | 5 | |
| | | | | | | | | A | |

A = LEXAN ® DL 1895 flame-retardant polycarbonate film (5 mils)
B = LEXAN ® DL 1900 non-flame-retardant polycarbonate film (5 mils)
X = ULTEM ® DL 4151 polyetherimide film (2 mils)
1 = 2BRK knitted woven glass cloth. Style 8790 (6.5 ounces per square yard)
2 = 2BRK knitted woven glass cloth. style 88081 (8.5 ounces per square yard)
3 = JPS 7781 satin weave glass cloth (9.1 ounces per square yard)
4 = 6781 satin weave glass cloth (9 ounces per square yard)
5 = 120E satin weave glass cloth (3.2 ounces per sq. yd.)

Flammability performance and physical properties for certain examples are shown in Table 4 below.

TABLE 4

| EX. | Flam.¹ | Thickness (inches) | wt/sf (lbs) | Flex. Mod.* | Flex Str.* | % Ash |
|---|---|---|---|---|---|---|
| 5 | pass | .031 | .32 | .17-L .12-C | 44.4-L 32.0-C | 55% |
| 6 | pass | .028 | .28 | .19-L .18-C | 49.4-L 47.1-C | 63% |
| 7 | pass | .031 | .31 | .16-L .15-C | 43.2-L 42.6-C | 56% |
| 8 | N/A | .031 | .30 | not tested | not tested | |
| 9 | N/A | .036 | .36 | not tested | not tested | |
| 10 | N/A | .021 | .20 | not tested | not tested | |
| 11 | N/A | .033 | .30 | not tested | not tested | |
| 12 | N/A | .025 | .23 | 1.6-L 1.2-C | 54.2-L 47.7-C | 50% |
| 13 | N/A | .026 | .24 | 2.2-L 2.3-C | 71.7-L 64.0-C | 52% |
| 14 | N/A | .030 | .30 | 2.1-L 2.0-C | 61.1-L 56.1-C | 60% |

¹Flam. = Pass flammability tests of FAA

The above data show that the aircraft components of the present invention will provide the necessary flammability resistance and impact properties for aircraft interiors. The composites demonstrate excellent flammability performance and meet the requirements of the FAA under FAR Appendix F, Part IV and specifications of aircraft manufacturers. It also shows that high density fiber reinforcement is important to meeting these flammability requirements, as is the use of a flame-retardant matrix material on the outer surfaces of the composite.

The composites of Examples 5-14 are thermoformed into a tray and/or speaker cone of this invention. The part geometries call for a depth of draw of about ½" for the speaker cone and a depth of draw of about ⅜" for the tray. The speaker cone is oval in shape with a maximum diameter of 9", a minimum diameter of 6", an oval depression (4"×6") at the center and a perimeter flange ranging in length from about 1" to 1.5". The tray has five sides which include two parallel sides (about 5.5") with a side perpendicular to the pair (about 4") at one end and two equal sides (about 2.5") at the other. The depth of the tray is about ⅜". Both the tray and the speaker cone have ribs incorporated in their structures.

A conventional shuttle machine with top and bottom heated platens (AAA Manufacturing) is used to thermoform these parts. Only the female ends of the tools are used. The speaker cone tool is comprised of a silicone material, and the tray tool is comprised of metal. The composites and tool are heated in the mold using quartz elements (calrods) and top and bottom oven controllers. The top controller is set at 55% output, and the bottom controller is set at 50% output. The oven dwell time is about 2.5 minutes, following which the vacuum is drawn through the tool. The mold dwell time subsequent to vacuum is less than 30 seconds.

The results obtained when thermoforming the composites of Examples 9-13 into the tray and speaker cone are summarized in Tables 6 and 7 below. These thermoforming results are compared to those obtained when molding non-reinforced films.

TABLE 6

Thermoforming Study of LEXAN ® Composites: Speaker Cone Tool

| Composite No. | Thickness | Depth | Rib Detail |
|---|---|---|---|
| 9 | .021 | 1¼" | Good |
| 10 | .033 | 1" | Good |
| 11 | .036 | ¼" | Fair |
| 12 | .025 | 1¼" | Poor |

TABLE 6-continued

Thermoforming Study of LEXAN ®
Composites: Speaker Cone Tool

| Composite No. | Thickness | Depth | Rib Detail |
|---|---|---|---|
| 13 | .026" | 1" | Poor |
| non-reinforced | .020" | 1½" | Excellent |

TABLE 7

Thermoforming Study of LEXAN ®
Composites: ⅞" Tray Tool

| Composite No. | Thickness | Contact Area | Rib Detail |
|---|---|---|---|
| 9 | .021" | 79% | Good |
| 10 | .033" | 74% | Good |
| 11 | .036" | 51% | Poor |
| 12 | .025" | 71% | Poor |
| 13 | .026" | 49% | Fair |
| non-reinforced | 0.17 | 100% | Excellent |

The thermoforming studies demonstrate that the reinforced composites which comprise the aircraft interior components of this invention will provide acceptable parts and finished by thermoforming. The knitted woven cloth is shown to be important in obtaining rib detail, i.e., parts with significant curves. The non-flame retardant core material is also shown to promote draw depth, as does the use of the 8970 style 2BRK knitted woven glass cloth.

A 24"×60" panel of the three-ply 2BRK/polycarbonate resin composites as described above is easily vacuum thermoformed into an aircraft sidewall panel of suitable dimensions for retrofitting within existing aircraft.

The preceding examples can be repeated with similar success by substituting the generically or specifically described fiber reinforcements and matrices and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A flame-resistant and smoke-resistant aircraft interior component, comprising at least 50 wt % of a woven glass cloth and up to 50 wt % of a flame-retardant matrix material which comprises a flame-retardant polycarbonate resin.

2. An interior component as in claim 1 with flammability resistance sufficient to exceed the 1990 fire and smoke standards of the Federal Aviation Administration.

3. An aircraft interior component as in claim 1, wherein samples thereof:
   (a) show a heat release rate of less than 65 kW/min/m² for the first two minutes and a peak release of less than 65 kW/m² within the first five minutes upon application of 3.5 watts/cm² of radiant heat, as determined by ASTM E906;
   (b) show a specific optical smoke density of less than 200, as determined by ASTM E662, after 4 minutes following ignition within an NBS smoke chamber;
   (c) do not burn-through after 5 minutes of exposure to a flame 6" from the surface, as determined by FAR 25, Appendix F (Part III, 1990); and
   (d) are self-extinguishing upon vertical exposure to a Bunsen burner flame for 60 seconds, as determined by FAR 25, Appendix F (Part IV, 1990).

4. An aircraft interior component as in claim 1, wherein samples thereof show a heat release rate of less than 50 kW/min/m2 within the first 2 minutes and maximum heat release of less than 50 kW/m² within the first 5 minutes of exposure to 3.5 watts/cm² of radiant heat, as determined by ASTM E906.

5. An aircraft interior component as in claim 1 selected from sidewall panels, ceiling panels, floor panels, equipment panels, partitions, window moldings, window slides, storage liners, cargo liners, equipment housings, seat housings, speaker housings, ducts, duct housings, grids, grid housings, window housings, shelves, trays, and storage housings.

6. An aircraft interior component as in claim 1 obtained by thermoforming a composite sheet having from 2-4 plies of knitted woven glass cloth and from 40-50 wt % of 50:50 tetrabromo BPA/BPA polycarbonate block copolymer.

7. An aircraft interior component as in claim 1 wherein the matrix at the core of the component is lower in flammability resistance than the matrix at the surface.

8. An aircraft interior component as in claim 1 having flame-retardant polyetherimide capping layers positioned on the outer surfaces.

9. A flame-resistant, vacuum-thermoformed, non-planar composite having at least one glossy surface finish comprising at least 50 wt % knitted woven glass cloth and up to 50 wt % of a flame-retardant matrix material which comprises flame-retardant polycarbonate resin, wherein samples of said composite show a heat release rate of less than 65 kW/min/m² for the first two minutes and a peak release of less than 65 kW/m² within the first five minutes upon application of 3.5 watts/cm² of radiant heat, as determined by ASTM E906.

10. A thermoformed non-planar composite as in claim 9, obtained from a planar composite which is drawn out of plane by a distance which corresponds to 5-20% of its length without tearing of the knitted woven glass cloth.

11. A flame-resistant, planar composite having a thickness of from 4 to 60 mils, which comprises at least 50 wt % knitted woven glass cloth in three plies and up to 50 wt % of a flame-retardant polycarbonate matrix material, wherein said planar composite:
   (a) shows a heat release rate of less than 65 kW/min/m² for the first two minutes and a peak release of less than 65 kW/m² within the first five minutes upon application of 3.5 watts/cm² of radiant heat, as determined by ASTM E906;
   (b) shows a specific optical smoke density of less than 200 as determined by ASTM E662, after 4 minutes upon ignition in an NBS smoke chamber;
   (c) does not burn-through upon exposure for 5 minutes to a flame 6" from the surface, as determined by FAR 25, Appendix F (Part III, 1990);
   (d) is self-extinguishing upon vertical exposure to a Bunsen burner flame for 60 seconds, as determined by FAR, Appendix F (Part IV, 1990),
   (e) has emissions of <500 ppm HCl, <150 ppm HCN, <100 ppm $SO_x$, <200 ppm HF, <3500 CO, and <100 ppm $NO_x$ upon ignition;
   (f) has flexural strength >3.5M (L) and >3.0M (C); and (g) shows flexural modulus >1.76 MM (L) and >1.16 MM (C).

12. A planar composite as in claim 11, wherein the matrix at the core of the composite is lower in flammability resistance than the matrix at the surfaces which comprise 50:50 tetrabromo BPA/BPA polycarbonate block copolymers.

13. A planar composite as in claim 11 having flame-retardant polyetherimide capping layers positioned on the outer surfaces.

14. A process for producing a flame-resistant, thermoformable composite by melt impregnating 2–4 sheets of fiber-reinforcement cloth with polycarbonate from layers thereof under heat and pressure, the improvements which comprise utilizing (a) at least 50 wt % knitted woven glass cloth, (b) flame-retardant polycarbonate copolymers, and (c) at least one core layer of non-flame-retardant thermoplastic in forming the composite.

15. A process as in claim 14, wherein a further improvement comprises allowing the composite formed to cool under pressure.

16. A process as in claim 14, wherein the flame-retardant polycarbonate cap layers comprise 50:50 tetrabromo BPA/BPA polycarbonate block copolymer, and the core layer of non-flame-retardant thermoplastic is comprised of polybutyleneterepthalate, polyethylene, polyethyleneterephthalate, polystyrene and mixtures thereof.

17. A process for producing a flame-resistant, thermoformable composite for aircraft interior components by melt impregnating 2–4 sheets of knitted woven glass cloth with flame-retardant polycarbonate, the improvement which comprises utilizing a continuous press at temperatures below 250° C.

* * * * *